(12) United States Patent
Nagata et al.

(10) Patent No.: US 11,579,164 B2
(45) Date of Patent: Feb. 14, 2023

(54) INERTIAL SENSOR, ELECTRONIC DEVICE, AND MOVABLE BODY

(71) Applicant: Seiko Epson Corporation, Toyko (JP)

(72) Inventors: Kazuyuki Nagata, Minowa (JP); Satoru Tanaka, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/178,575

(22) Filed: Feb. 18, 2021

(65) Prior Publication Data

US 2021/0255212 A1 Aug. 19, 2021

(30) Foreign Application Priority Data

Feb. 19, 2020 (JP) ............................. JP2020-026014

(51) Int. Cl.
*G01P 15/03* (2006.01)
*G01P 15/08* (2006.01)
*B60R 21/0132* (2006.01)

(52) U.S. Cl.
CPC ........ *G01P 15/032* (2013.01); *B60R 21/0132* (2013.01); *G01P 15/08* (2013.01); *B60R 2021/01325* (2013.01)

(58) Field of Classification Search
CPC ............ G01P 15/032; G01P 15/08; G01P 2015/0831; G01P 2015/0871; G01P 2015/0882; G01P 15/125; B60R 21/0132; B60R 2021/01325
See application file for complete search history.

(56) References Cited

U.S. PATENT DOCUMENTS

| 6,044,707 A * | 4/2000 | Kato ................. G01C 19/5719 73/504.12 |
| 6,856,219 B2 * | 2/2005 | Kawai ...................... H01G 5/16 335/78 |
| 9,939,457 B2 * | 4/2018 | Kigure .................... G01P 1/003 |

(Continued)

FOREIGN PATENT DOCUMENTS

| JP | 2017-509494 A | 4/2017 |
| JP | 2018-044871 A | 3/2018 |

(Continued)

OTHER PUBLICATIONS

Machine translation of WO2010032818A1 (2010).*

*Primary Examiner* — Melissa J Koval
*Assistant Examiner* — Sangkyung Lee
(74) *Attorney, Agent, or Firm* — Harness, Dickey & Pierce, P.L.C.

(57) ABSTRACT

An inertial sensor, includes: a substrate; a fixing portion that is provided on the substrate; a first movable body that faces the substrate and that is displaceable with a first support beam as a first rotation axis; the first support beam that is arranged in a first direction and that couples the first movable body and the fixing portion; a second movable body that is displaceable due to deformation of a second support beam; the second support beam that is arranged in a second direction intersecting the first direction and that couples the first movable body and the second movable body; and a protrusion that is provided on the substrate or the second movable body, overlaps the second movable body in plan view from a third direction and that protrudes toward the second movable body or the substrate.

12 Claims, 10 Drawing Sheets

(56) References Cited

U.S. PATENT DOCUMENTS

| | | |
|---|---|---|
| 2015/0241216 A1 | 8/2015 | Ahtee et al. |
| 2017/0082519 A1 | 3/2017 | Blomqvist et al. |
| 2018/0252744 A1 | 9/2018 | Kamada et al. |
| 2018/0275163 A1* | 9/2018 | Tanaka .................. G01P 15/125 |
| 2019/0063924 A1 | 2/2019 | Tanaka |
| 2019/0064202 A1* | 2/2019 | Tanaka ............... G01C 19/5705 |

FOREIGN PATENT DOCUMENTS

| | | | |
|---|---|---|---|
| JP | 6365678 B2 | 8/2018 | |
| JP | 2018-146330 A | 9/2018 | |
| JP | 2018-530765 A | 10/2018 | |
| JP | 2019-045172 A | 3/2019 | |
| WO | WO-2006005417 A1 * | 1/2006 | ......... B60C 23/0408 |
| WO | WO-2010032818 A1 * | 3/2010 | ......... G01C 19/5719 |

* cited by examiner

INERTIAL SENSOR, ELECTRONIC DEVICE, AND MOVABLE BODY

The present application is based on, and claims priority from JP Application Serial Number 2020-026014, filed Feb. 19, 2020, the disclosure of which is hereby incorporated by reference herein in its entirety.

BACKGROUND

1. Technical Field

The present disclosure relates to an inertial sensor, an electronic device, and a movable body.

2. Related Art

In recent years, an inertial sensor manufactured using micro electro mechanical systems (MEMS) technology is developed. As such an inertial sensor, for example, JP-A-2019-45172 discloses an inertial sensor which includes a substrate, a movable body that swings in a seesaw manner around a rotation axis along a vertical direction with respect to the substrate, and detection electrodes provided on the substrate. The inertial sensor can detect an acceleration in the vertical direction based on a change in capacitance between a first movable part and a second movable part of the movable body that have different rotational moments around the rotation axis, and a first detection electrode and a second detection electrode, and the first and second movable parts and the first and second detection electrodes are respectively arranged at positions facing each other.

Further, this inertial sensor is provided with a protrusion on the substrate to prevent an end portion of the movable body from coming into contact with the substrate when the movable body swings excessively in a seesaw manner.

However, in the inertial sensor described in JP-A-2019-45172, when the movable body and the protrusion collide with each other due to excessive seesaw swing, rigidity of the movable body and the protrusion is high, so that the impact cannot be absorbed and the movable body or the protrusion may be damaged.

SUMMARY

An inertial sensor includes: a substrate; a fixing portion that is provided on the substrate; a first movable body that faces the substrate and that is displaceable with a first support beam as a first rotation axis; the first support beam that is arranged in a first direction and that couples the first movable body and the fixing portion; a second movable body that is displaceable due to deformation of a second support beam; the second support beam that is arranged in a second direction intersecting the first direction and that couples the first movable body and the second movable body; and a protrusion that is provided on the substrate or the second movable body, that overlaps the second movable body in plan view from a third direction intersecting the first direction and the second direction, and that protrudes toward the second movable body or the substrate.

An electronic device includes the inertial sensor described above and a control unit that performs controlling based on a detection signal output from the inertial sensor.

A movable body includes the inertial sensor described above and a control unit that performs controlling based on a detection signal output from the inertial sensor.

DESCRIPTION OF EXEMPLARY EMBODIMENTS

1. First Embodiment

First, an inertial sensor 1 according to a first embodiment is described with reference to FIGS. 1 and 2 by taking an acceleration sensor that detects an acceleration in a vertical direction (a Z direction) as an example.

Figure 1:
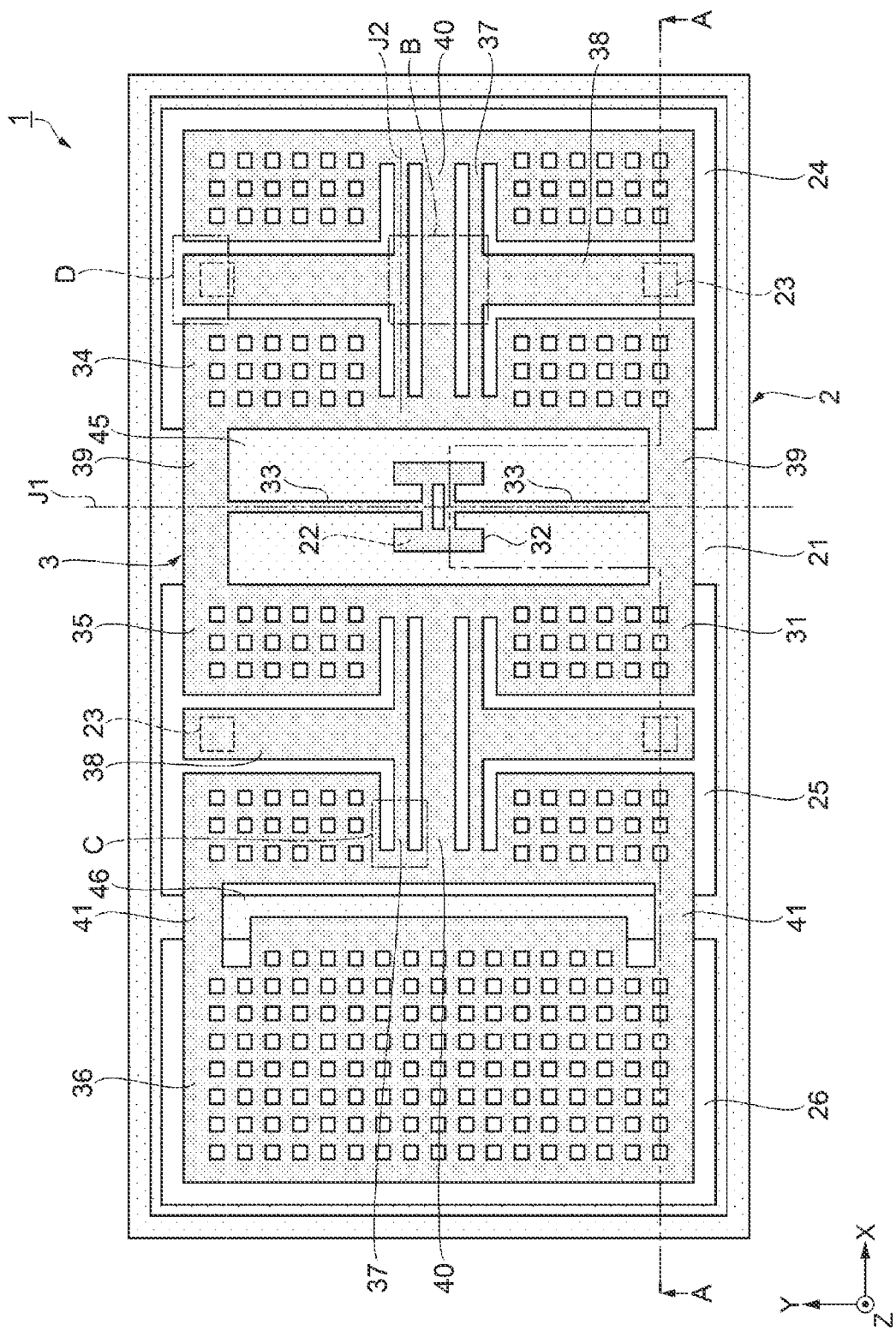
FIG. 1 is a plan view illustrating a schematic structure of an inertial sensor according to a first embodiment.

FIG. 1 shows a state in which a lid 5 is removed for convenience of describing an internal configuration of the inertial sensor 1. Further, in FIG. 1, a wiring in a recess 21 of a substrate 2 is omitted.

Further, for convenience of illustration, an X-axis, a Y-axis, and a Z-axis are shown in each figure as three axes orthogonal to one another. Further, a direction along the X-axis is referred to as an "X direction", a direction along the Y-axis is referred to as a "Y direction", and a direction along the Z-axis is referred to as the "Z direction". Further, a tip end side of an arrow in each axial direction is referred to as a "plus side", a base end side is referred to as a "minus side", a plus side in the Z direction is referred to as "up", and a minus side in the Z direction is also referred to as "down". Further, the Z direction is along the vertical direction, and an XY plane is along a horizontal plane. Further, a first direction in the present embodiment is the Y direction, a second direction is the X direction, and a third direction is the Z direction.

Figure 2:
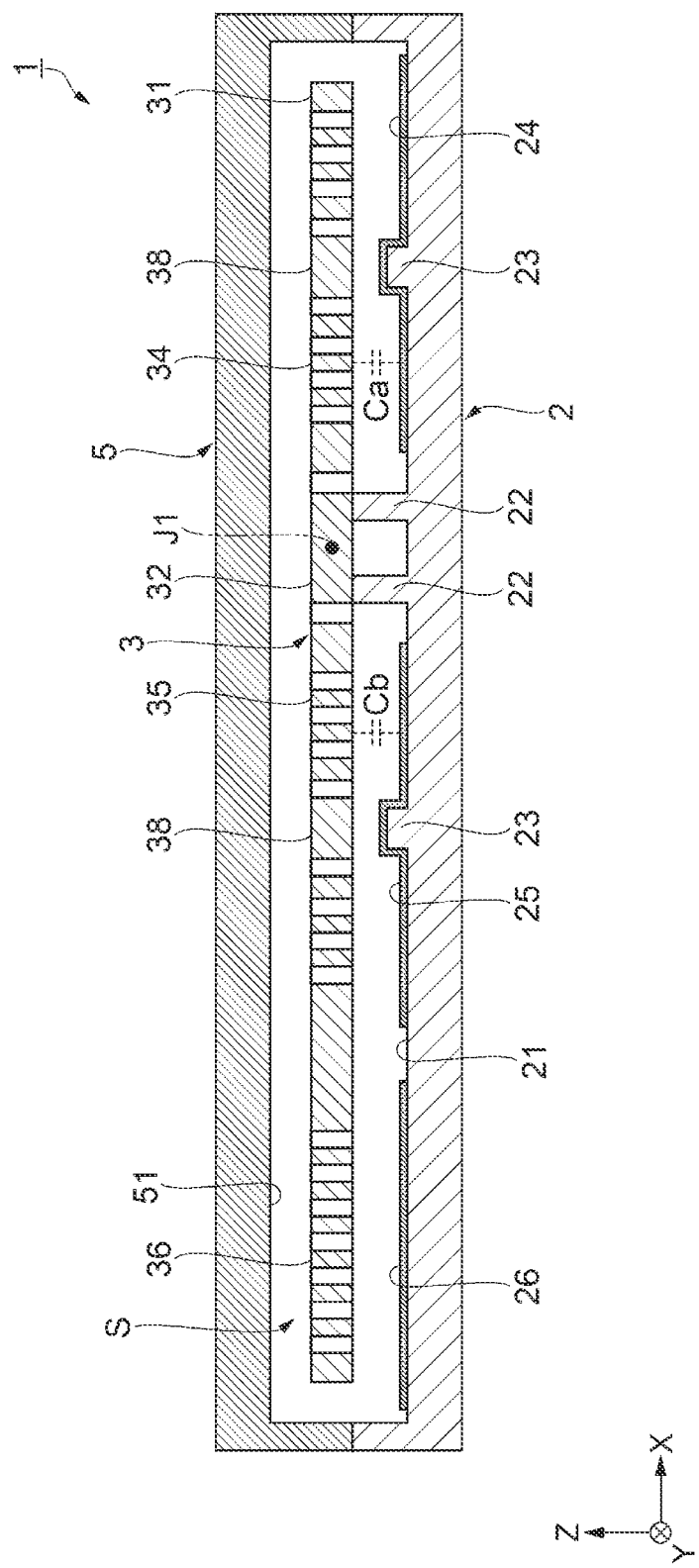
FIG. 2 is a cross-sectional view taken along a line A-A in FIG. 1.

The inertial sensor 1 shown in FIGS. 1 and 2 can detect an acceleration of a sensor element 3 in the vertical direction (the Z direction). Such an inertial sensor 1 includes the substrate 2, the sensor element 3 arranged on the substrate 2, and the lid 5 bonded to the substrate 2 and covering the sensor element 3.

As shown in FIG. 1, the substrate 2 includes a spread in the X direction and the Y direction, and a thickness is in the Z direction. Further, as shown in FIG. 2, the recess 21 that opens toward an upper surface side is formed on the substrate 2. In plan view from the Z direction, the recess 21 includes the sensor element 3 therein, and is formed larger than the sensor element 3. The recess 21 functions as a relief portion that prevents contact between the sensor element 3 and the substrate 2. Further, the substrate 2 includes a fixing portion 22 and protrusions 23 protruding from a bottom surface of the recess 21 toward a sensor element 3 side, and a first detection electrode 24, a second detection electrode 25, and a dummy electrode 26 are arranged on the bottom surface of the recess 21. The sensor element 3 is bonded to an upper surface of the fixing portion 22. Further, the protrusion 23 is arranged at a position overlapping a second movable body 38, which will be described later, in the plan view from the Z direction.

The protrusion 23 functions as a stopper that restricts, when excessive seesaw swing occurs in the first movable body 31, further seesaw swing of a first movable body 31 by contact with the second movable body 38 coupled to the first movable body 31. By providing such a protrusion 23, it is possible to prevent excessive approach or wide area contact between the first movable body 31 and the first detection electrode 24, and between the first movable body and the second detection electrode 25, which have different potentials, and it is possible to effectively prevent occurrence of "sticking" in which the first movable body 31 is attracted to the first detection electrode 24 or the second detection electrode 25 and does not return due to an electrostatic attraction generated between the first movable body 31 and the first detection electrode 24 or between the first movable body 31 and the second detection electrode 25.

The substrate 2 can use, for example, a glass substrate formed of a glass material including an alkali metal ion which is a movable ion such as Nat, for example, borosilicate glass such as Pyrex (registered trademark) glass and Tempax (registered trademark) glass. However, the substrate 2 is not particularly limited, and for example, a silicon substrate or a ceramic substrate may be used.

Further, as shown in FIG. 1, on the substrate 2, the first detection electrode 24, the second detection electrode 25 and the dummy electrode 26, which overlap the sensor element 3 in plan view, are arranged on the bottom surface of the recess 21.

As shown in FIG. 2, a recess 51 that opens toward a lower surface side is formed on the lid 5. The lid 5 houses the sensor element 3 in the recess 51 and is bonded to an upper surface of the substrate 2. An accommodation space S that accommodates the sensor element 3 is formed inside the lid 5 and the substrate 2. It is preferable that the accommodation space S is an airtight space, and is filled with an inert gas such as nitrogen, helium, or argon, and has an operating temperature of about −40° C. to 125° C., which is substantially atmospheric pressure. However, an atmosphere of the accommodation space S is not particularly limited, and may be, for example, a depressurized state or a pressurized state.

As the lid 5, for example, a silicon substrate can be used. However, the present disclosure is not particularly limited, and for example, a glass substrate or a ceramic substrate may be used. A method of bonding the substrate 2 and the lid 5 is not particularly limited, and may be appropriately selected depending on a material of the substrate 2 or the lid 5. For example, the method includes anodic bonding, activation bonding of bonding bonding surfaces activated by plasma irradiation, bonding with a bonding material which is glass frit or the like, diffusion bonding of bonding metal films formed at the upper surface of the substrate 2 and a lower surface of the lid 5.

The sensor element 3 is formed by etching a conductive silicon substrate doped with impurities such as phosphorus (P), boron (B), and arsenic (As), and is particularly formed by patterning based on a Bosch process, which is a deep groove etching technique. As shown in FIG. 1, the sensor element 3 includes a holding portion 32 bonded to the upper surface of the fixing portion 22, the first movable body 31 that is displaceable with respect to the holding portion 32 around a rotation axis J1 serving as a first rotation axis along the Y axis, a first support beam 33 that couples the first movable body 31 and the holding portion 32, the second movable bodies 38 that are displaceable with respect to the holding portion 32 around a rotation axis J2 serving as a second rotation axis along the X axis, and second support beams 37 that couple the first movable body 31 and the second movable bodies 38 arranged adjacently in the X direction. For example, the fixing portion 22 and the holding portion 32 are anodically bonded, and the first support beam 33 couples the first movable body 31 and the fixing portion 22 via the holding portion 32.

The first movable body 31 has a rectangular shape with the X direction as a longitudinal direction in the plan view from the Z direction. Further, the first movable body 31 includes a first mass portion 34 and a second mass portion arranged with the rotation axis J1 along the Y axis sandwiched therebetween and a third mass portion 36 coupled to the second mass part 35 in the plan view from the Z direction. The first mass portion 34 is located on a plus side in the X direction with respect to the rotation axis J1, and the second mass portion 35 and the third mass portion are located on a minus side in the X direction with respect to the rotation axis J1. Further, the second mass portion 35 and the third mass portion 36 are longer in the X direction than the first mass portion 34, and rotational moment of the second mass portion 35 and the third mass portion 36 around the rotation axis J1 when an acceleration Az in the Z direction is applied is larger than that of the first mass portion 34.

Due to this difference in rotational moment, the first movable body 31 swings around the rotation axis J1 in a seesaw manner when the acceleration Az is applied. The seesaw swing means that when the first mass portion 34 is displaced to the plus side in the Z direction, the second mass portion 35 is displaced to the minus side in the Z direction, and on the contrary, when the first mass portion 34 is displaced to the minus side in the Z direction, the second mass portion 35 is displaced to the plus side in the Z direction.

Further, in the first movable body 31, the first mass portion 34 and the second mass portion 35 are coupled by first coupling portions 39, and an opening 45 located between the first mass portion 34 and the second mass portion 35 is provided. Further, the holding portion 32 and the first support beam 33 are arranged in the opening 45. By arranging the holding portion 32 and the first support beam 33 inside the first movable body 31 in this way, a size of the sensor element 3 can be reduced. Further, the first movable body 31 includes a plurality of through holes uniformly formed in an entire area thereof. As a result, damping due to viscosity can be reduced. However, the through holes may be omitted, and arrangement thereof may not be uniform.

Further, in the first movable body 31, the first coupling portions 39 and the holding portion 32 arranged adjacently in the Y direction are coupled by the first support beam 33 extending in the Y direction. Therefore, the first support beam 33 can be used as the rotation axis J1, and the first movable body 31 can be displaced around the rotation axis J1 by the seesaw swing.

The first mass portion 34 is formed of two mass portions, and the two mass portions are coupled by a second coupling portion 40 at a central portion in the Y direction. In the first mass portion 34, the second movable bodies 38 extending in the Y direction from a second coupling portion 40 side are arranged on both sides of the second coupling portion 40 in the Y direction, and both X-direction sides of an end portion of the second movable body 38 on the second coupling portion 40 side and the two mass portions are coupled by the second support beam 37 extending in the X direction. More specifically, the second support beam 37 arranged on the plus side in the Y direction of the second coupling portion 40 couples the second movable body 38 extending in the plus side in the Y direction and the two mass portions of the first mass portion 34, which are arranged adjacently in the X direction, and the second support beam 37 arranged on the minus side in the Y direction of the second coupling portion 40 couples the second movable body 38 extending in the minus side in the Y direction and the two mass portions of the first mass portion 34, which are arranged adjacently in the X direction.

Similar to the first mass portion 34, the second mass portion 35 is formed of two mass portions, and the two mass portions are coupled by the second coupling portion 40 at the central portion in the Y direction. In the second mass portion 35, the second movable body 38 extending in the Y direction from the second coupling portion 40 side is arranged on the both sides of the second coupling portion 40 in the Y direction, and the both X-direction sides of the end portion of the second movable body 38 on the second coupling portion 40 side and the two mass portions are coupled by the second support beam 37 extending in the X direction. Further, an end portion of the second mass portion 35 on the minus side in the X direction is coupled to the third mass portion 36 by a third coupling portion 41, and an opening 46 is provided between the second mass portion 35 and the third mass portion 36 to make areas of the first mass portion 34 and the second mass portion 35 on the XY plane equal to each other.

Since the second support beam 37 arranged in the first mass portion 34 and the second mass portion 35 has a beam shape extending in the X direction, the second support beam 37 can act as the rotation axis J2 along the X axis intersecting the rotation axis J1, and the second movable body 38 coupled to the second support beam 37 can be displaced around the rotation axis J2. Further, in the plan view from the Z direction, the protrusions 23 provided on the substrate 2 are arranged at positions overlapping tip end portions on an opposite side of the second movable body 38 from a side of the second movable body 38 that is coupled to the second support beam 37.

Therefore, when the second movable body 38 and the protrusion 23 come into contact with each other when the excessive seesaw swing occurs in the first movable body 31, the second support beam 37 is deformed so as to twist around the rotation axis J2, impact with the protrusion 23 can be reduced, damage of the second movable body 38 or the protrusion 23 can be reduced, and further seesaw swing of the first movable body 31 can be restricted. Therefore, the second support beam 37 and the second movable body 38 function as a damper that absorbs the impact.

Torsional rigidity of the second support beam 37 around the rotation axis J2 is higher than torsional rigidity of the first support beam 33 around the rotation axis J1. Therefore, when the same force is applied, a displacement amount of the second movable body 38 based on the second support beam 37 is smaller than a displacement amount of the first movable body 31 based on the first support beam 33, so that the protrusion 23 can function as the stopper due to the second support beam 37 and the second movable body 38.

In the present embodiment, when one second support beam 37, the second movable body 38, and the protrusion 23 are set as one set, four sets are arranged. In the plan view from the Z direction, two sets are arranged in the first mass portion 34 and the second mass portion 35 with the Y direction parallel to the rotation axis J1 sandwiched therebetween, and in the first mass portion 34 and the second mass portion 35, two sets of the second support beam 37, the second movable body 38, and the protrusion 23 are arranged so as to sandwich the second coupling portion 40 and face each other. Since the four sets of the second support beam 37, the second movable body 38, and the protrusion 23 are symmetrically arranged with the Y direction sandwiched therebetween, unnecessary displacement around the rotation axis J1 is unlikely to occur. Further, since the four sets of the second support beam 37, the second movable body 38, and the protrusion 23 are symmetrically arranged with the X direction sandwiched therebetween, unnecessary displacement around the rotation axis J2 is unlikely to occur.

Further, the rotation axis J2 of the second support beam 37 is oriented along the X axis orthogonal to the rotation axis J1 along the Y axis of the first support beam 33, so that impact resistance from the X direction can be improved in a state of including a damper function and a stopper function. That is, the reason is that when the rotation axis J1 of the first support beam 33 and the rotation axis J2 of the second support beam 37 are oriented along the Y axis, the first movable body 31 is largely displaced in the X direction in response to the impact from the X direction, and characteristics are likely to deteriorate.

Next, the first detection electrode 24, the second detection electrode 25, and the dummy electrode 26 arranged on the bottom surface of the recess 21 will be described.

As shown in FIGS. 1 and 2, in the plan view from the Z direction, the first detection electrode 24 is arranged so as to overlap the first mass portion 34, and the second detection electrode 25 is arranged so as to overlap the second mass portion 35. The first detection electrode 24 and the second detection electrode 25 are provided substantially symmetrically to the rotation axis J1 in the plan view from the Z direction so as to make capacitances Ca and Cb, which will be described later, equal in a natural state where the acceleration Az is not applied.

Further, the dummy electrode 26 is located on the minus side in the X direction with respect to the second detection electrode 25, and is provided so as to overlap the third mass portion 36. Thus, by covering the bottom surface of the recess 21 with the dummy electrode 26, it is possible to prevent charging of the bottom surface of the recess 21 caused by movement of the alkali metal ion in the substrate 2. Therefore, it is possible to effectively prevent generation of an unintended electrostatic attraction that leads to a malfunction of the first movable body 31 between the bottom surface of the recess 21 and the second mass portion 35. Therefore, the inertial sensor 1 can detect the acceleration Az more accurately.

Although not shown, when the inertial sensor 1 is driven, a driving voltage is applied to the sensor element 3 via a wiring (not shown), the first detection electrode 24 and an QV amplifier, and the second detection electrode and another QV amplifier are respectively coupled by wirings (not shown). Accordingly, the capacitance Ca is formed between the first mass portion 34 and the first detection electrode 24, and the capacitance Cb is formed between the second mass portion 35 and the second detection electrode 25. In the natural state where the acceleration Az is not applied, the capacitances Ca and Cb are substantially equal to each other.

When the acceleration Az is applied to the inertial sensor 1, the first movable body 31 swings in a seesaw manner around the rotation axis J1. Due to the seesaw swing of the first movable body 31, a gap between the first mass portion 34 and the first detection electrode and a gap between the second mass portion 35 and the second detection electrode 25 change in opposite phases, and in response to this, the capacitances Ca and Cb change in opposite phases. Therefore, the inertial sensor 1 can detect the acceleration Az based on changes in the capacitances Ca and Cb.

The inertial sensor 1 of the present embodiment includes the second movable bodies 38 each of which is displaceable due to deformation of the second support beam 37 provided on the first movable body 31 and the protrusions 23 each of which is provided on the substrate 2, overlaps the second movable body 38 and protrudes toward the second movable body 38 in the plan view from the Z direction. Therefore, when the second movable body 38 and the protrusion 23 come into contact with each other when the excessive seesaw swing occurs in the first movable body 31, the second support beam 37 is deformed so as to twist around the rotation axis J2, so that the impact with the protrusion 23 can be reduced, and the damage of the second movable body 38 or the protrusion 23 can be reduced.

Further, by arranging a plurality of second support beams 37 extending in the X direction facing each other with the second coupling portions 40 sandwiched therebetween, a length of the second support beams 37 in the X direction can be increased, and the impact with the protrusion 23 can be further reduced.

Further, since the torsional rigidity of the second support beam 37 is higher than the torsional rigidity of the first support beam 33, the displacement amount of the second movable body 38 is smaller than the displacement amount of the first movable body 31, and the excessive seesaw swing of the first movable body 31 can be restricted.

2. Second Embodiment

Figure 3:
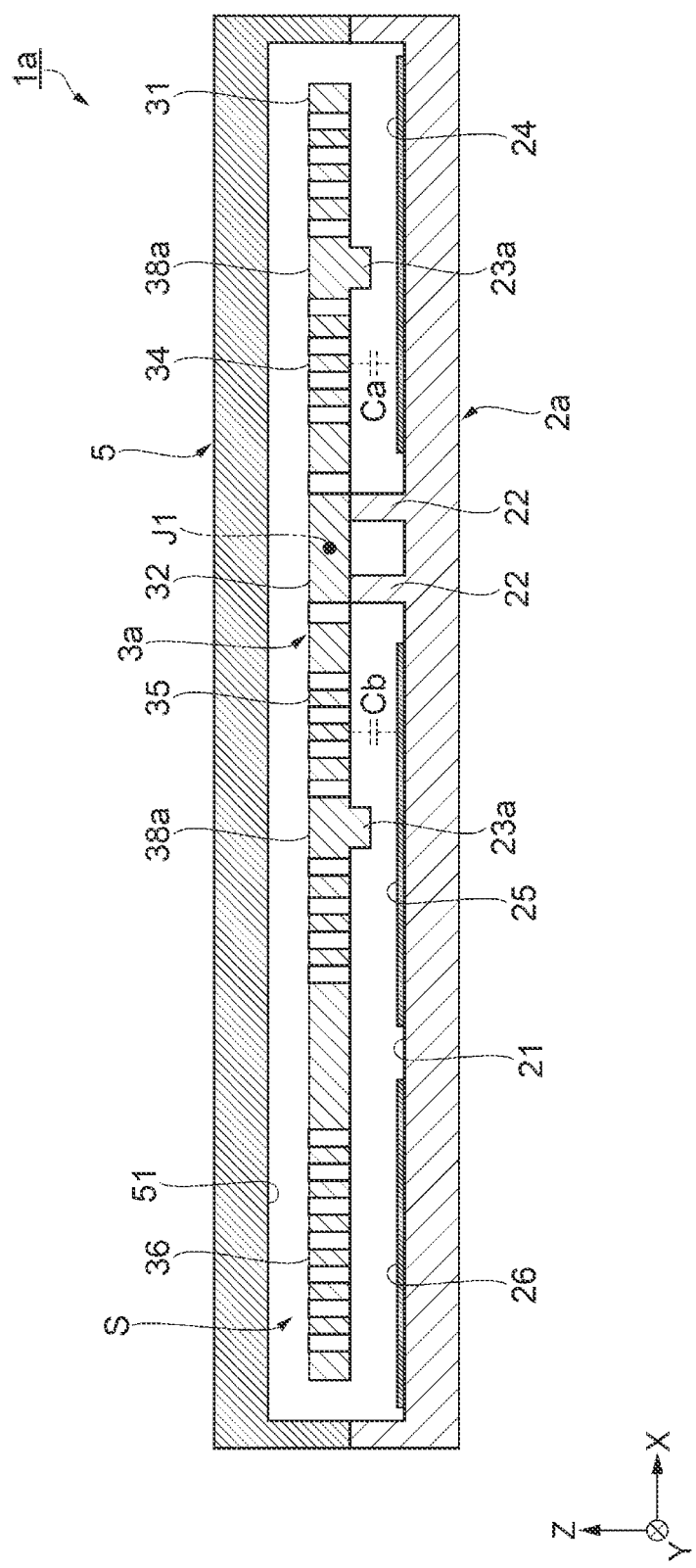
FIG. 3 is a cross-sectional view illustrating a schematic structure of an inertial sensor according to a second embodiment.

Next, an inertial sensor 1a according to a second embodiment will be described with reference to FIG. 3. FIG. 3 corresponds to a cross-sectional view taken along a line A-A in FIG. 1.

The inertial sensor 1a of the present embodiment is the same as the inertial sensor 1 of the first embodiment except that structures of a sensor element 3a and a substrate 2a are different from those of the inertial sensor of the first embodiment. Differences from the first embodiment described above will be mainly described, and a description of similar matters will be omitted.

As shown in FIG. 3, the sensor element 3a of the inertial sensor 1a is provided with protrusions 23a protruding toward the substrate 2a on a second movable body 38a. Therefore, when the excessive seesaw swing occurs in the first movable body 31, the protrusions 23a provided on the second movable body 38a and a bottom surface of the recess 21 of the substrate 2a come into contact with each other, so that the same effect as that of the inertial sensor 1 of the first embodiment can be obtained.

3. Third Embodiment

Figure 4:
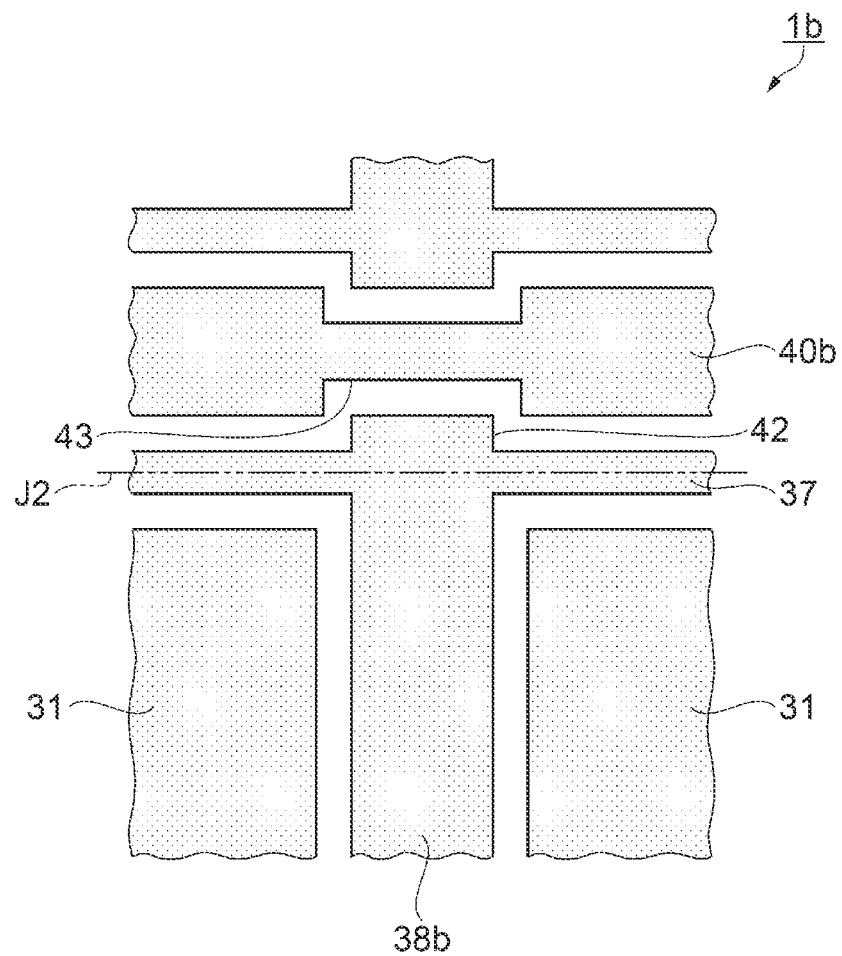
FIG. 4 is a plan view illustrating a schematic structure of an inertial sensor according to a third embodiment.

Next, an inertial sensor 1b according to a third embodiment will be described with reference to FIG. 4. FIG. 4 corresponds to a plan view in a position of a part B in FIG. 1.

The inertial sensor 1b of the present embodiment is the same as the inertial sensor 1 of the first embodiment except that structures of a second movable body 38b and a second coupling portion 40b are different from those of the inertial sensor 1 of the first embodiment. Differences from the first embodiment described above will be mainly described, and a description of similar matters will be omitted.

As shown in FIG. 4, the inertial sensor 1b is provided with protrusions 42 each protruding toward a second coupling portion 40b side on a side of the second movable body 38b coupled to the second support beam 37. Further, at a position of the second coupling portion 40b facing the protrusion 42, a recess 43 opening toward a protrusion 42 side is provided in order to avoid contact with the protrusion 42 caused by a displacement of the second movable body 38b. By providing the protrusion 42, when the second movable body 38b is displaced around the rotation axis J2, a stress generated at a coupling portion between the second movable body 38b and the second support beam 37 can be dispersed to the coupling portion between the protrusion 42 and the second support beam 37, and therefore, it is possible to alleviate concentration of the stress on the coupling portion and prevent damage at the coupling portion. Therefore, the inertial sensor 1b can improve a mechanical strength of the coupling portion between the second support beam 37 and the second movable body 38b, and can obtain the same effect as that of the inertial sensor 1 of the first embodiment.

4. Fourth Embodiment

Figure 5:
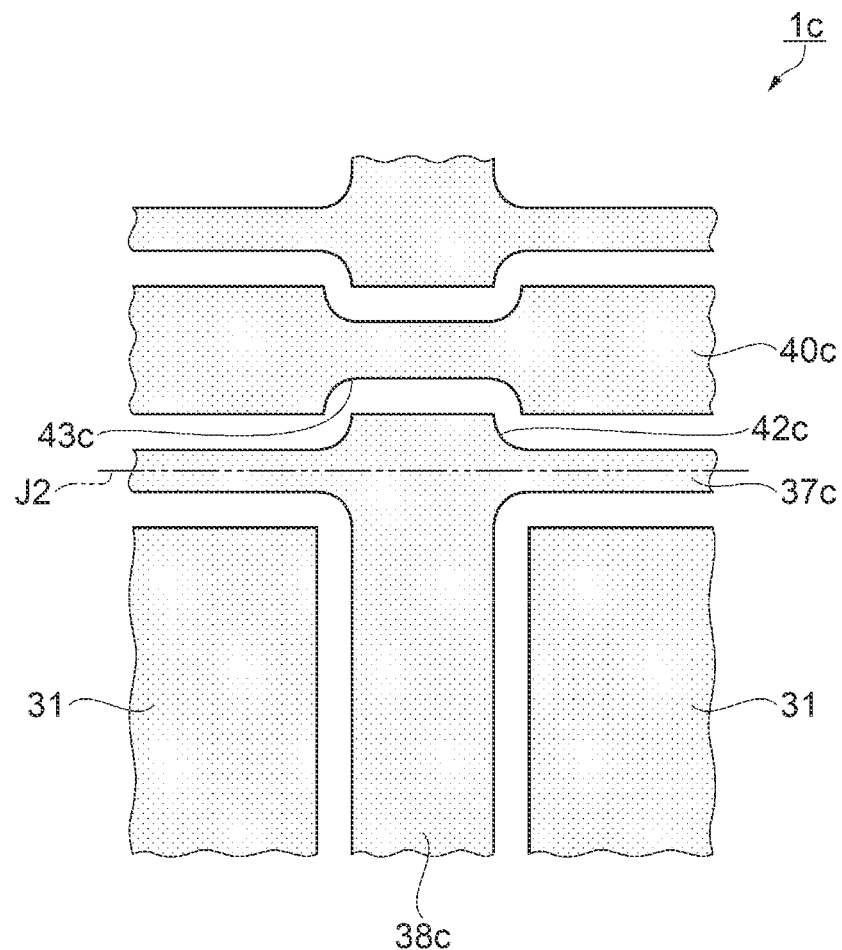
FIG. 5 is a plan view illustrating a schematic structure of an inertial sensor according to a fourth embodiment.

Next, an inertial sensor 1c according to a fourth embodiment will be described with reference to FIG. 5. FIG. 5 corresponds to a plan view in a position of a part B in FIG. 1.

The inertial sensor 1c of the present embodiment is the same as the inertial sensor 1 of the first embodiment except that structures of a second movable body 38c and a second coupling portion 40c are different from those of the inertial sensor 1 of the first embodiment. The differences from the first embodiment described above will be mainly described, and the description of the similar matters will be omitted.

As shown in FIG. 5, the inertial sensor 1c is provided with protrusions 42c each protruding toward a second coupling portion 40c side on a side of the second movable body 38c coupled to a second support beam 37c, and a coupling portion between the second movable body 38c and the second support beam 37c and a coupling portion between the protrusion 42c and the second support beam 37c have curved surfaces. Further, at a position of the second coupling portion 40c facing the protrusion 42c, a recess 43c opening toward a protrusion 42c side and including curved surfaces at two corners of the recess is provided in order to avoid contact with the protrusion 42c caused by a displacement of the second movable body 38c. By setting the coupling portions to have the curved surfaces, when the second movable body 38c is displaced around the rotation axis J2, it is possible to alleviate the concentration of the stress on the coupling portion between the second support beam 37c and the second movable body 38c or the coupling portion between the second support beam 37c and the protrusion 42c, and it is possible to prevent the damage at the coupling portions. Therefore, the inertial sensor 1c can improve a mechanical strength of the coupling portion between the second support beam 37c and the second movable body 38c, and can obtain the same effect as that of the inertial sensor 1 of the first embodiment.

5. Fifth Embodiment

Figure 6:
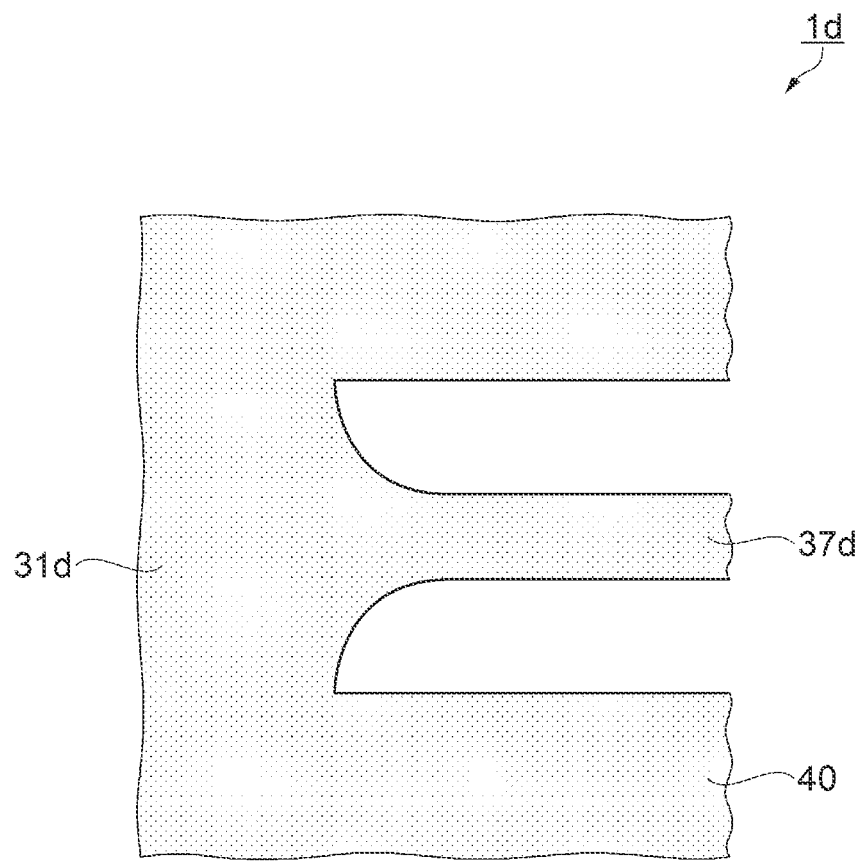
FIG. 6 is a plan view corresponding to a position of a part C in FIG. 1 and illustrating a schematic structure of an inertial sensor according to a fifth embodiment.

Next, an inertial sensor 1d according to a fifth embodiment will be described with reference to FIG. 6. FIG. 6 corresponds to a plan view in a position of the part C in FIG. 1.

The inertial sensor 1d of the present embodiment is the same as the inertial sensor 1 of the first embodiment except that structures of a first movable body 31d and a second support beam 37d are different from those of the inertial sensor 1 of the first embodiment. The differences from the first embodiment described above will be mainly described, and the description of the similar matters will be omitted.

As shown in FIG. 6, in the inertial sensor 1d, a coupling portion between the first movable body 31d and the second support beam 37d has a curved surface. Further, curved surface shapes of a coupling portion on both sides of the second support beam 37d are line-symmetrical with respect to the X axis. In the present embodiment, the curved surface of the coupling portion is ¼ circular in the plan view from the Z direction, but the present disclosure is not limited thereto, and a semicircular shape may be used.

By setting the coupling portions to have the curved surfaces, when the second movable body 38 is displaced around the rotation axis J2, it is possible to alleviate the concentration of the stress on the coupling portions, and it is possible to prevent the damage at the coupling portions. Therefore, the inertial sensor 1d can improve a mechanical strength of the coupling portion between the first movable body 31d and the second support beam 37d, and can obtain the same effect as that of the inertial sensor 1 of the first embodiment.

6. Sixth Embodiment

Figure 7:
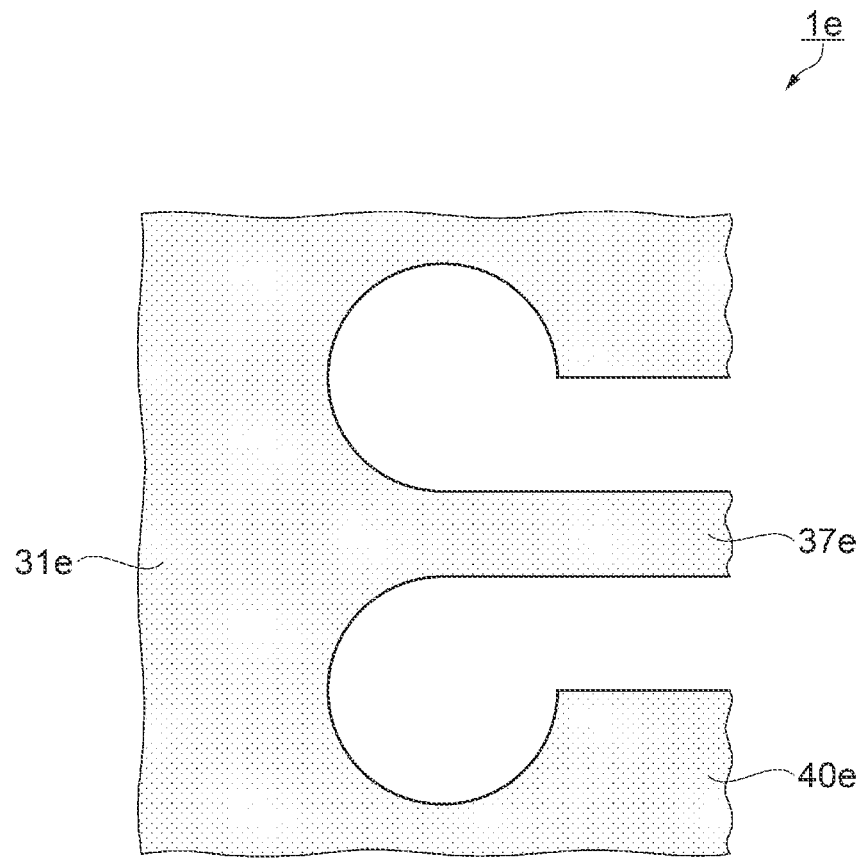
FIG. 7 is a plan view corresponding to the position of the part C in FIG. 1 and illustrating a schematic structure of an inertial sensor according to a sixth embodiment.
Figure 7:
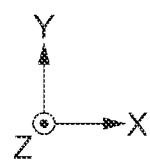

Next, an inertial sensor 1e according to a sixth embodiment will be described with reference to FIG. 7. FIG. 7 corresponds to a plan view in the position of the part C in FIG. 1.

The inertial sensor 1e of the present embodiment is the same as the inertial sensor 1 of the first embodiment except that structures of a first movable body 31e and a second support beam 37e are different from those of the inertial sensor 1 of the first embodiment. The differences from the first embodiment described above will be mainly described, and the description of the similar matters will be omitted.

As shown in FIG. 7, in the inertial sensor 1e, a coupling portion between the first movable body 31e and the second support beam 37e has a curved surface. Further, in the plan view from the Z direction, curved surface shapes of the coupling portion on both sides of the second supporting beam 37e are circles each having a diameter larger than a length of a gap between the first movable body 31e and the second support beam 37e in the Y direction or a length of a gap between a second coupling portion 40e and the second support beam 37e in the Y direction, and are axisymmetric with respect to the X axis. The curved surface shapes of the coupling portion on both sides of the second support beam 37d are not limited to circles having the same diameter, and may be circles having different diameters.

By setting the coupling portions to have the curved surfaces, when the second movable body 38 is displaced around the rotation axis J2, it is possible to alleviate the concentration of the stress on the coupling portions, and it is possible to prevent the damage at the coupling portions. Therefore, the inertial sensor 1e can improve a mechanical strength of the coupling portion between the first movable body 31e and the second support beam 37e, and can obtain the same effect as that of the inertial sensor 1 of the first embodiment.

7. Seventh Embodiment

Figure 8:
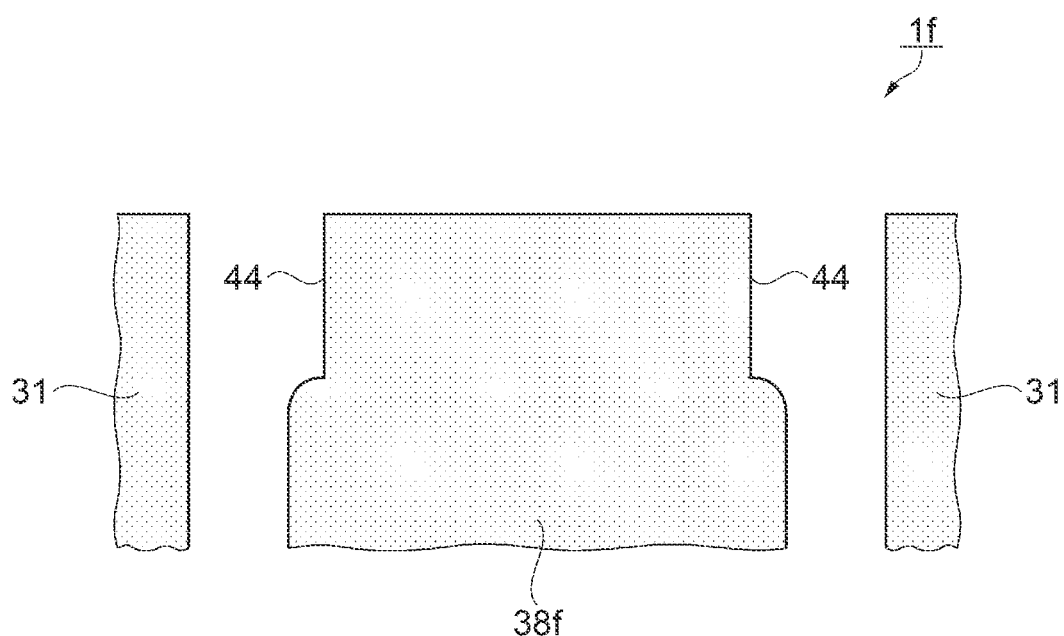
FIG. 8 is a plan view corresponding to a position of a part D in FIG. 1 and illustrating a schematic structure of an inertial sensor according to a seventh embodiment.

Next, an inertial sensor 1f according to a seventh embodiment will be described with reference to FIG. 8. FIG. 8 corresponds to a plan view in a position of a part D in FIG. 1.

The inertial sensor 1f of the present embodiment is the same as the inertial sensor 1 of the first embodiment except that a structure of a second movable body 38f is different from that of the inertial sensor 1 of the first embodiment. The differences from the first embodiment described above will be mainly described, and the description of the similar matters will be omitted.

As shown in FIG. 8, in the inertial sensor 1f, notches 44 facing the first movable body 31 are provided at an end portion on an opposite side of a second movable body 38f from a side of the second movable body 38f that is coupled to the second support beam 37. More specifically, the notches 44 are provided respectively on both sides of a tip end portion of the second movable body 38f in the X direction.

By providing the notches 44 in the second movable body 38f, it is possible to prevent the first movable body 31 and the second movable body 38f from colliding with each other caused by an impact from the X direction or the Y direction, and to prevent the first movable body 31 or the second movable body 38f from being damaged. Therefore, the inertial sensor 1f is excellent in impact resistance, and can obtain the same effect as that of the inertial sensor 1 of the first embodiment.

Further, a coupling portion between a portion of the second movable body 38f on a second support beam 37 side and the notche 44 has a curved surface projecting toward a first movable body 31 side. As a result, it is possible to prevent the curved surface projecting toward the first movable body 31 side from colliding with the first movable body 31 due to the impact from the X direction or the Y direction, and it is possible to prevent the first movable body 31 or the second movable body 38f from being damaged.

8. Eighth Embodiment

Figure 9:
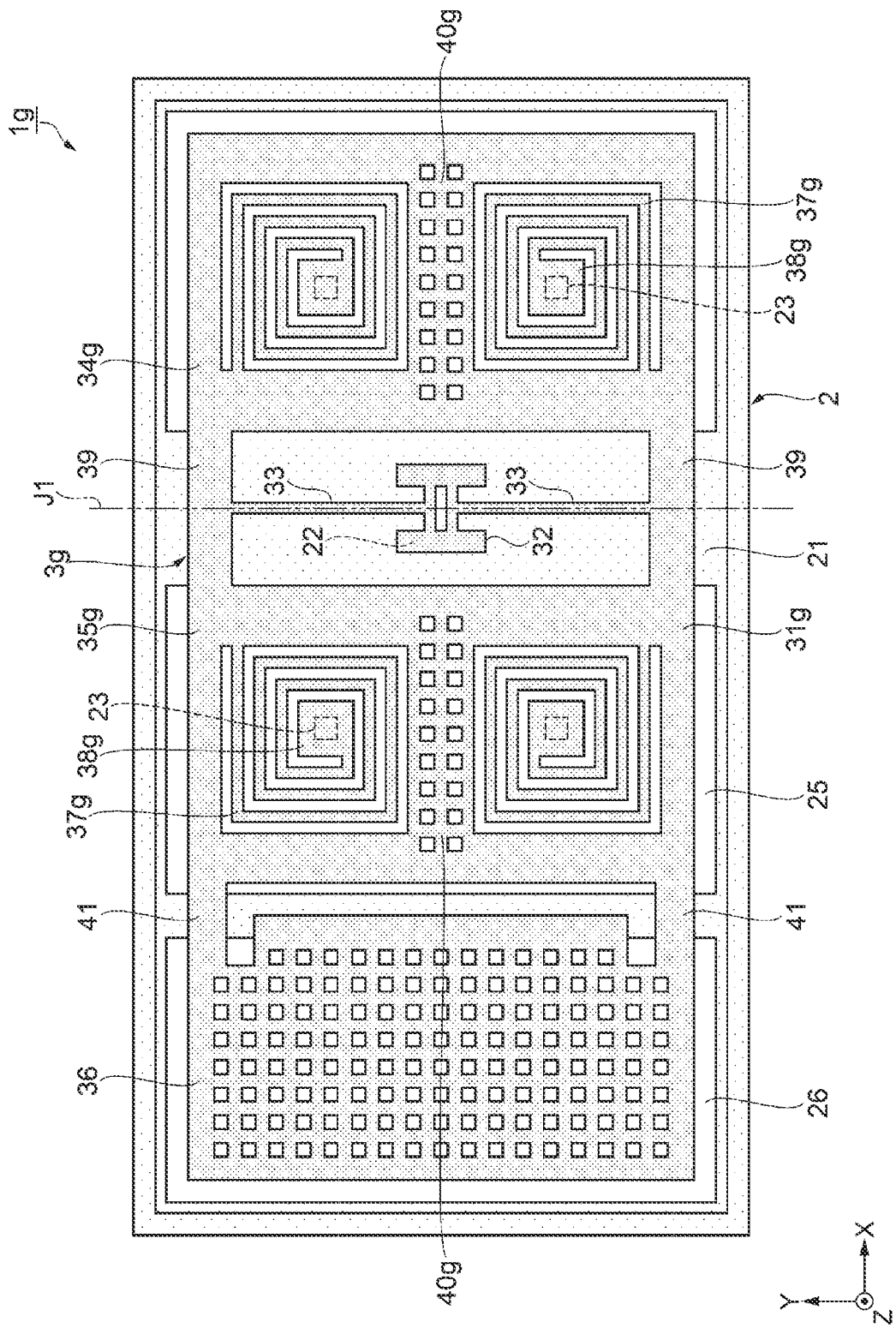
FIG. 9 is a plan view illustrating a schematic structure of an inertial sensor according to an eighth embodiment.

Next, an inertial sensor 1g according to an eighth embodiment will be described with reference to FIG. 9. FIG. 9 illustrates a state in which the lid 5 is removed for convenience of description.

The inertial sensor 1g of the present embodiment is the same as the inertial sensor 1 of the first embodiment except that a structure of a sensor element 3g is different from that of the inertial sensor 1 of the first embodiment. The differences from the first embodiment described above will be mainly described, and the description of the similar matters will be omitted.

As shown in FIG. 9, in the inertial sensor 1g, a plurality of second movable bodies 38g are arranged in a first mass portion 34g and a second mass portion 35g of the first movable body 31g with the second coupling portions 40g sandwiched therebetween, and the first mass portion 34g, the second mass portion 35g, and the second movable body 38g are coupled by a second support beam 37g having a spiral shape. The second support beams 37g are spiral springs, and the second movable bodies 38g are displaceable in the Z direction. Further, the protrusions 23 protruding from the substrate 2 to the second movable bodies 38g are arranged at positions overlapping the second movable bodies 38g in the plan view from the Z direction.

Therefore, when the second movable bodies 38g and the protrusions 23 come into contact with each other when the excessive seesaw swing occurs in the first movable body 31g, the second support beams 37g are deformed so as to bend, and the impact with the protrusions 23 can be reduced, the damage of the second movable bodies 38g or the protrusions 23 can be reduced, and further seesaw swing of the first movable body 31g can be restricted. Therefore, the second support beams 37g and the second movable bodies 38g in the inertial sensor 1g function as a damper that absorbs the impact, and the same effect as that of the inertial sensor 1 of the first embodiment can be obtained.

9. Ninth Embodiment

Next, a smartphone 1200 as an example of an electronic device including one of the inertial sensors 1 to 1g according to a ninth embodiment will be described. In the following description, a configuration to which the inertial sensor 1 is applied will be illustrated and described.

Figure 10:
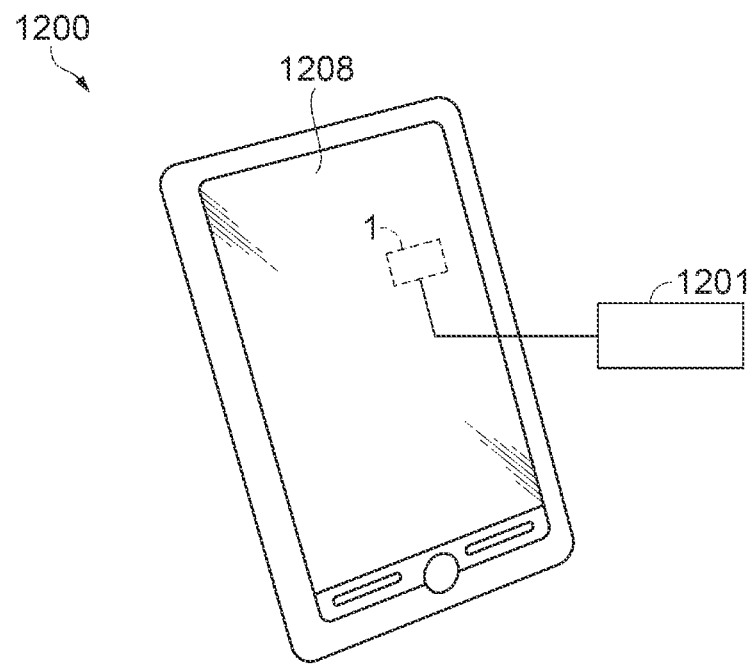
FIG. 10 is a perspective view schematically illustrating a configuration of a smartphone which is an example of an electronic device.

As shown in FIG. 10, the inertial sensor 1 described above is incorporated in the smartphone 1200 as the electronic device. Detection data as a detection signal such as an acceleration detected by the inertial sensor 1 is transmitted to a control unit 1201 of the smartphone 1200. The control unit 1201 can include a central processing unit (CPU), recognize a posture or behavior of the smartphone 1200 based on the received detection data, change a display image displayed on a display unit 1208, ring warning sounds or effect sounds, and vibrate a main body by driving a vibration motor. In other words, it is possible to perform motion sensing of the smartphone 1200, and change a display content or generate sounds, vibration, or the like based on the measured posture or behavior. In particular, when a game application is executed, it is possible to experience a sense of reality that is close to reality.

In addition to the above smartphone 1200, the inertial sensors 1 to 1g can be applied to, for example, a personal computer, a digital still camera, a tablet terminal, a watch, a smart watch, an ink jet printer, a laptop personal computer, a television, smart glasses, a wearable terminal such as a head-mounted display (HMD), a video camera, a video tape recorder, a car navigation device, a drive recorder, a pager, an electronic notebook, an electronic dictionary, an electronic translator, a calculator, an electronic game device, a toy, a word processor, a workstation, a video phone, a surveillance television monitor, electronic binoculars, a POS terminal, a medical device, a fish finder, various measurement devices, a device for mobile terminal base station, various instruments such as a vehicle, a railroad vehicle, an aircraft, a helicopter and a ship, a flight simulator, a network server, or the like.

10. Tenth Embodiment

Next, an automobile 1500 as an example of the movable body including one of the inertial sensors 1 to 1g according to a tenth embodiment will be described. In the following description, the configuration to which the inertial sensor 1 is applied will be illustrated and described.

Figure 11:
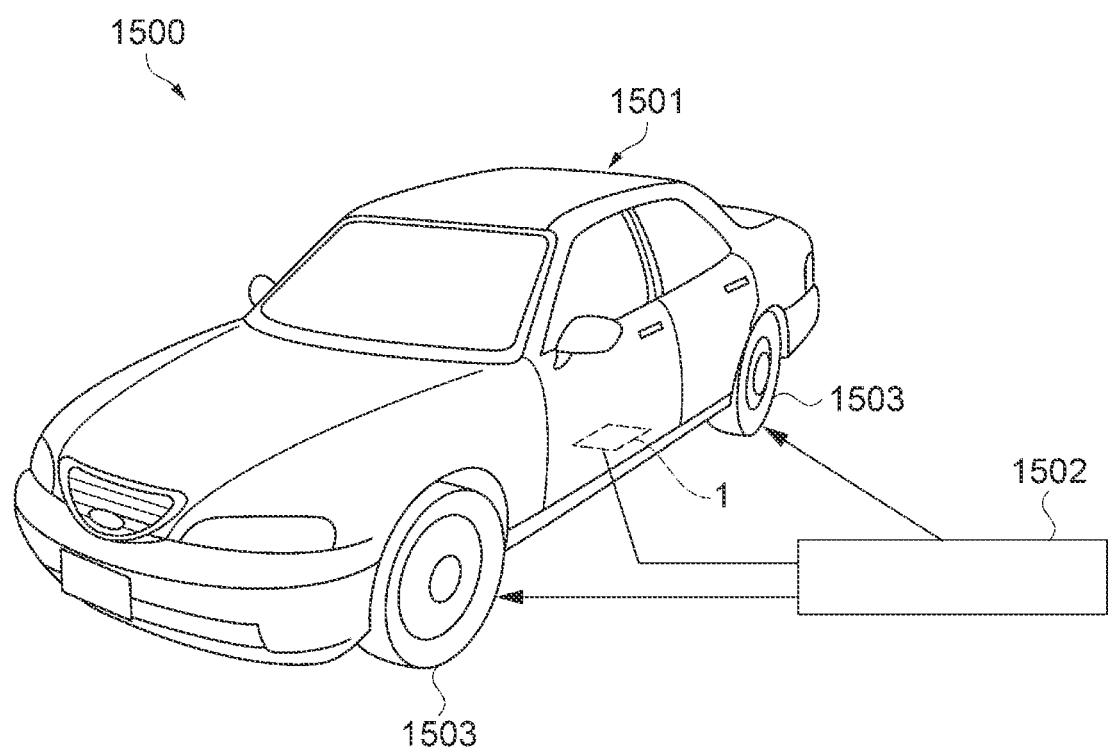
FIG. 11 is a perspective view illustrating a configuration of an automobile as an example of a movable body.

As shown in FIG. 11, the automobile 1500 as the movable body has the inertial sensor 1 built-in, and for example, the inertial sensor 1 can detect a movement or a posture of a vehicle body 1501. The detection signal of the inertial sensor 1 can be supplied to a vehicle body posture control device 1502 as a control unit that controls the movement or the posture of the vehicle body 1501, and the vehicle body posture control device 1502 can detect the posture of the vehicle body 1501 based on the signal, control hardness of a suspension according to a detection result, and control brakes of individual wheels 1503.

In addition, the inertial sensors 1 to 1g can be widely applied to a keyless entry system, an immobilizer, a car navigation system, a car air conditioner, an anti-lock brake system (ABS), an air bag, a tire pressure monitoring system (TPMS), an engine control system (an engine system), an inertial navigation control device for autonomous driving, an electronic control unit (ECU) of a battery monitor for a hybrid vehicle or an electric vehicle or the like.

In addition to the above examples, the inertial sensors 1 to 1g can be used for movement or posture control of bipedal walking robots or trains, remote control of radio-controlled aircrafts, radio-controlled helicopters, and drones, or movement or posture control of autonomous flying objects, movement or posture control of agricultural machinery or construction machinery, and control of rockets, artificial satellites, ships, and automated guided vehicles (AGVs).

What is claimed is:

1. An inertial sensor, comprising:
   a substrate;
   a fixing portion provided on the substrate;
   a movable base body disposed above the substrate and facing the substrate, the movable base body being configured with:
      a first support beam extending in a first direction, the first support beam coupling between the movable base body and the fixing portion;
      a first movable body connected to the first support beam, a first body part and a second body part of the first movable body being provided on both sides of the first support beam in a plan view along a second direction perpendicular to the first direction, the first movable body being displaceable with the first support beam as a first rotation axis;
      a second support beam extending in the second direction, the second support beam continuously extending from an edge of the first part of the first movable body, one end of the second support beam being connected to the edge of the first body part of the first movable body; and
      a second movable body connected to the second support beam, a third body part and a fourth body part of the second movable body being provided on both sides of the second support beam in the plan view along the first direction, the third body part of the second movable body being displaceable due to deformation of the second support beam; and
   a protrusion provided on either the substrate or the second movable body, the protrusion overlapping the second movable body in the plan view, the protrusion protruding along a third direction perpendicular to the first direction and the second direction.

2. The inertial sensor according to claim 1,
   wherein the movable base body further includes:
      a third support beam extending in the second direction, the second support beam continuously extending from the edge of the first part of the first movable body, one end of the third support beam being connected to the edge of the first body part of the first movable body, the fourth body part of the second movable body is displaceable due to deformation of the third support beam, and the third support beam is located between the first support beam and the fourth body part of the second movable body in the plan view.

3. The inertial sensor according to claim 1, wherein
the third body part of the second movable body includes a convex structure adjacent to the second support beam, and the convex structure protrudes from the second support beam along the first direction and faces the fourth body part of the second movable body.

4. The inertial sensor according to claim 1, wherein
the second support beam is displaceable as a second rotation axis that intersects the first rotation axis.

5. The inertial sensor according to claim 1, wherein
the second support beam is a spiral spring.

6. The inertial sensor according to claim 1, wherein
a coupling portion between the second movable body and the second support beam has a curved surface.

7. The inertial sensor according to claim 1, wherein
a coupling portion between the first movable body and the second support beam has a curved surface.

8. The inertial sensor according to claim 1, wherein
the third body part of the second movable body extends along the first direction, and third body part has a first end and a second end outwardly opposite to each other, the first end of the third body part is connected to the second support beam, and the second end of the third body part has a notch, and the notch faces the first movable body along the second direction.

9. The inertial sensor according to claim 8, wherein
a side surface of the third body part of the second movable body adjacent to the notch is a curved surface projecting toward the first movable body along the second direction.

10. The inertial sensor according to claim 1, wherein
torsional rigidity of the second support beam is higher than torsional rigidity of the first support beam.

11. An electronic device, comprising:
the inertial sensor according to claim 1.

12. A movable body, comprising:
the inertial sensor according to claim 1.

\* \* \* \* \*